(12) United States Patent
Magens et al.

(10) Patent No.: US 7,387,243 B2
(45) Date of Patent: Jun. 17, 2008

(54) SYSTEM FOR IDENTIFYING AND MANAGING PALLETS

(75) Inventors: Ernst-Peter Magens, Ammersbek (DE); Frank Manken, Henstedt-Ulzburg (DE); Martin von Werder, Ammersbek (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 11/523,948

(22) Filed: Sep. 20, 2006

(65) Prior Publication Data

US 2007/0069017 A1    Mar. 29, 2007

(30) Foreign Application Priority Data

Sep. 24, 2005  (DE) ................ 20 2005 015 095 U

(51) Int. Cl.
  *G06F 19/00* (2006.01)
  *G06Q 30/00* (2006.01)
  *G06Q 90/00* (2006.01)
(52) U.S. Cl. ...................... 235/385; 235/492
(58) Field of Classification Search ........ 235/383–385, 235/492; 705/22, 28
  See application file for complete search history.

(56) References Cited

U.S. PATENT DOCUMENTS 6,496,806 B1 * 12/2002  Horwitz et al. ............... 705/28
6,669,089 B2   12/2003  Cybulski et al. ............ 235/385
7,155,304 B1 * 12/2006  Charych ...................... 700/214

FOREIGN PATENT DOCUMENTS

DE  20 2005 005 409    6/2005
NL         9401836     6/1996

* cited by examiner

*Primary Examiner*—Lisa M Caputo
(74) *Attorney, Agent, or Firm*—Vidas, Arrett & Steinkraus, P.A.

(57) ABSTRACT

System for identifying and managing pallets, which are placed at or picked up from bin locations by means of an industrial truck, with the following characteristics: a box-shaped housing, which contains all components required for communicating with transponders as well as evaluating signals from the transponders, in particular a read/write unit, a send/receive circuit and an evaluation unit, wherein the evaluation unit has an interface to an on-board, the box-shaped housing is attached to the bottom side of the lower cross bar of a support for the loading fork between the fork arms, a single transponder is attached to the front side of the middle block of the pallet, and/or a rack support at the entrance that faces the industrial truck is provided with a transponder on a longitudinal support.

8 Claims, 2 Drawing Sheets

SYSTEM FOR IDENTIFYING AND MANAGING PALLETS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

RFID-supported processes are being increasingly used within the framework of the improvement of logistical chain processes. The loading equipment, e.g. the pallet as well as the bin location, is provided with identifiers, e.g. transponders, in which data is saved. With the help of read/write devices, data can be written to and read from the transponders. The use of these types of transponders in connection with industrial trucks is described in "Hebezeuge und Fördermittel", Berlin 45 (2005) 5, pages 246 and 247.

An industrial truck is known from U.S. Pat. No. 6,669,089, the entire contents of which is incorporated herein by reference, in which a plurality of antennas is arranged in the vicinity of the fork carrier of an industrial truck. With the help of the antennas as well as separate evaluation, display and operating units, data can be written to or read from the RFID transponders on the loading equipment. At least two transponders, which are arranged diagonal to the loading equipment, are attached to the pallets. This results in a relatively short distance between antenna and transponder, indeed with the disadvantage that at least two transponders are required for each piece of loading equipment.

It is known from NL 9401836, the entire contents of which is incorporated herein by reference, to use one transponder per loading equipment. The antennas for reading and writing the transponder are housed within the fork arms. This enables a short read separation distance, however, the fork arms are weakened by the integrated antennas and the shielding by the fork arms limits the functional capability of the antennas.

It is known from DE 20 2005 005 409 U1, the entire contents of which is incorporated herein by reference, to arrange an antenna on the support of a loading fork, namely behind a level, which is formed by the middle level through cross bars of the fork support.

In all known implementations, other separate devices that help analyze the antenna signals are required in addition to the antennas. In the known cases, the signals are displayed by a display or a monitor of an on-board computer located in the driver's cab. Due to the conditions on the industrial truck and based on the relatively weak power level of the antennas, the required connections between the components are prone to interference.

The object of the invention is to create a system for identifying and managing pallets that has a simple structure and that is less prone to interference.

BRIEF SUMMARY OF THE INVENTION

In the case of the system in accordance with the invention, all components required for communicating with transponders and for evaluating transponder signals, in particular a read/write unit and a send/receive circuit as well as an evaluation unit, are accommodated in a single box-like housing. The evaluation unit is provided with an interface to an on-board computer in the industrial truck. The box-shaped housing is attached to the bottom side of the lower cross bar of a support for the loading fork between the fork arms. A transponder is attached to each pallet, namely on the front side or within a middle block of the pallet. The antenna and the transponder thereby lie at approximately the same height when a pallet is picked up. Regardless of the orientation of the picked-up pallet, the distance between the antenna and the transponder is almost of the same. The transponder and the box-shaped housing are effectively protected against interference when handling the industrial truck and the pallets. All electrical components required for communicating with transponders are accommodated in the housing as is the evaluation unit for evaluating the signals from the transponders so that only one single connection cable to the on-board computer is required.

In accordance with one embodiment of the invention, a transponder is also provided ate at least one bin location. If the bin location is formed by a rack system, another embodiment of the invention attaches transponders to the front entrance of the rack support that faces the vehicle during stacking and unstacking.

If the bin location is on the ground, e.g. in a hall, then a transponder is arranged below the bin location in accordance with an alternative embodiment.

In accordance with another embodiment of the invention, the rectangular, box-shaped housing, which is e.g. made of plastic, is picked up by a U-shaped bracket, which is attached to the bottom side of the cross bar. In accordance with another embodiment of the invention, it can be suspended in a pivotable manner in order to adjust the angular position of the bracket and thus the read/write unit within a certain limit. The alignment of the antenna with the transponder can thereby be improved.

The invention is explained in greater detail using drawings.

DETAILED DESCRIPTION OF THE INVENTION

Figure 1:
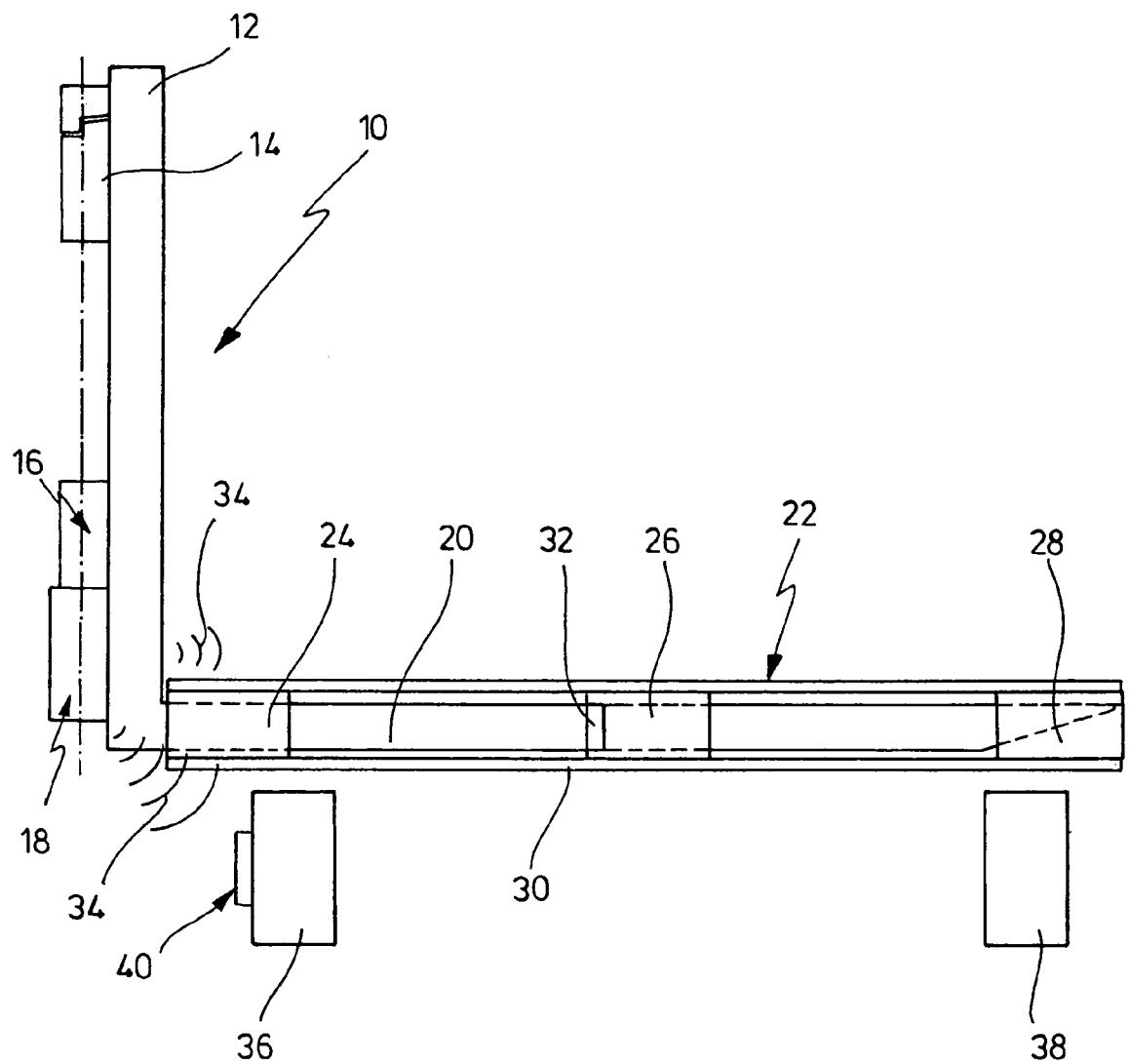
FIG. 1 shows a lateral view of a loading fork for an industrial truck when picking up a pallet from a rack.

While this invention may be embodied in many different forms, there are described in detail herein a specific preferred embodiment of the invention. This description is an exemplification of the principles of the invention and is not intended to limit the invention to the particular embodiment illustrated FIG. 1 shows a loading fork 10 of an industrial truck that is not illustrated in greater detail. The loading fork is attached to a fork support with its fork back 12, from which an upper cross section 14 and a bottom cross section 16 can be identified. A box-shaped housing 18 is attached to the bottom side of the lower cross section. Its front side abuts on the level of the rear edge of the fork backs 12.

The fork arms 20 engage with a pallet 22, e.g. a Euro pallet. The longitudinal sides and the longitudinal center of this type of pallet have three rows of blocks, wherein in FIG. 1 the center row is shown with blocks 24, 26, 28, through which the support boards are connected with stand boards. In FIG. 1, the middle stand board is labeled with the number 30. As also indicated in FIG. 1, a transponder 32 is attached to the front side of the middle block 26 (as seen from the longitudinal direction of the pallet). When the pallet is picked up on the other end, the transponder lies on the back side of the block 26. It is implemented as a passive transponder.

An antenna, a send/receive circuit and an evaluation unit (not shown) are located in the rectangular housing 18. The on-board power-supply voltage of the industrial truck supplies the send circuit, which e.g. sends a UHF signal, as indicated by 34. The UHF signal, e.g. with a frequency of 868 MHZ, is received by transponder 32. It is prompted to broadcast a signal, the content of which is saved in the transponder's memory. The receive circuit receives the signal coming from the transponder, which is evaluated in the evaluation circuit. This signal primarily contains the identification of the pallet and, if necessary, the associated bin location. With the help of the read/write unit, this type of information or another type of information associated with the pallet or the bin location can also be written to the memory of the transponder 32.

In FIG. 1, the pallet 22 is placed on two horizontal support profiles 36, 38 shown in cross-section of a rack that is not shown in greater detail or is lifted from it. As also shown in FIG. 1, a transponder 40 is also arranged on the front side of the front horizontal support profile 36. With the help of the read unit in housing 18, the bin location on the rack can also be identified.

Figure 2:
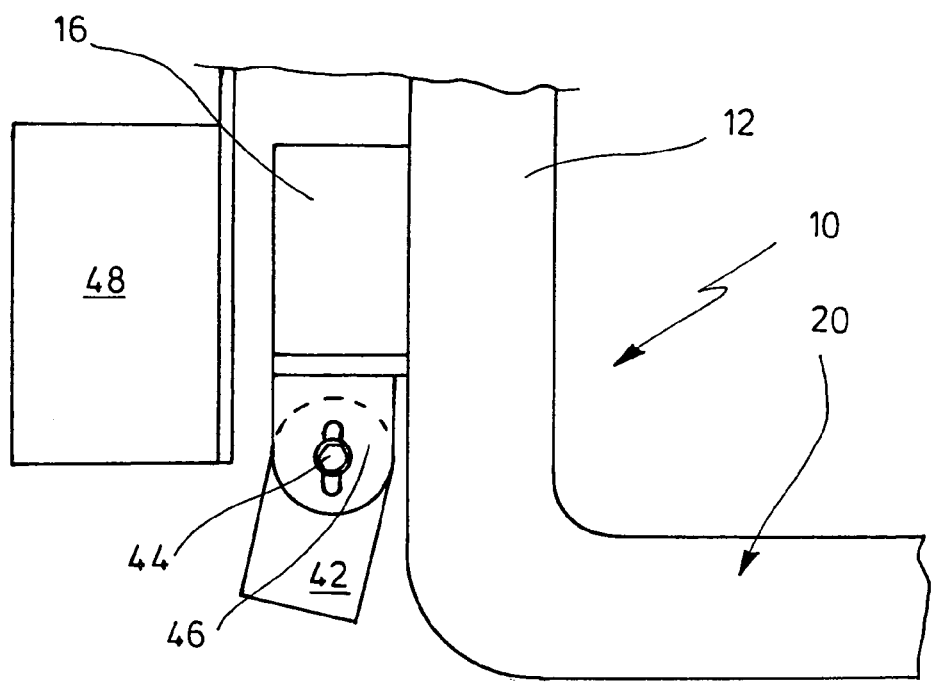
FIG. 2 shows one perspective of the lateral view of a part of the loading fork of the industrial truck in FIG. 1.
Figure 3:
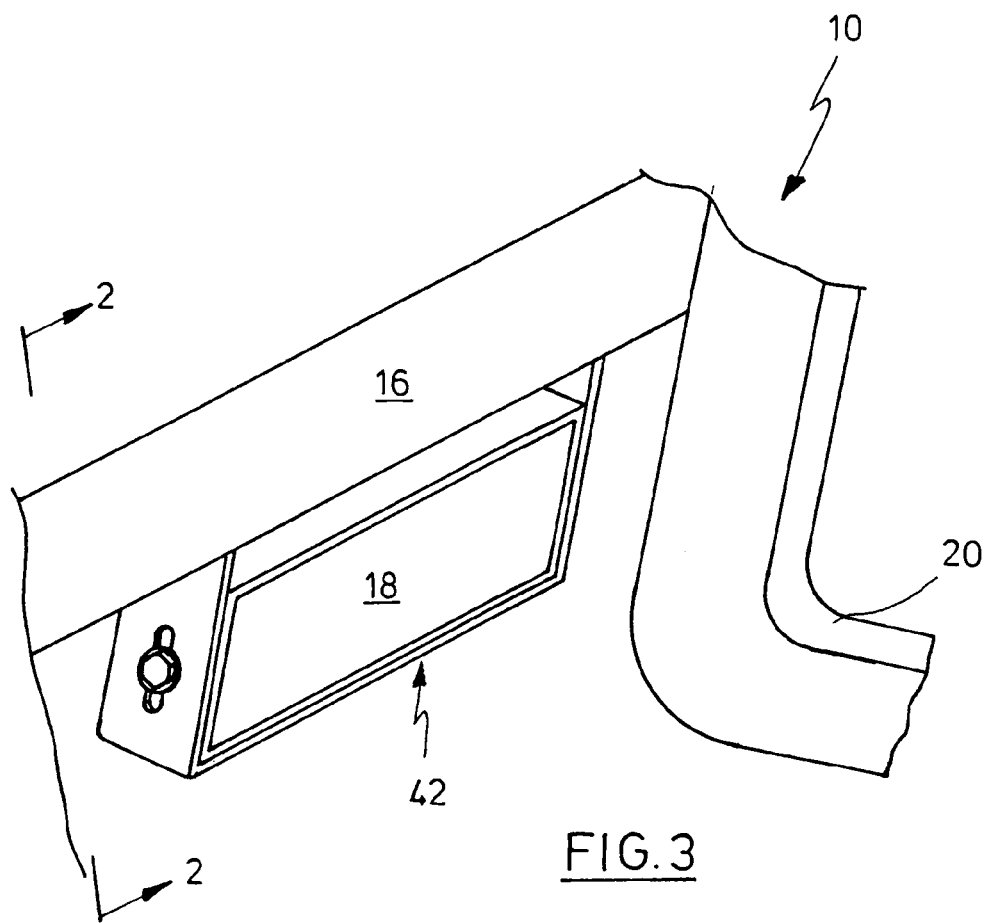
FIG. 3 shows a diagonal front-view perspective of the loading fork in FIG. 3.

The bottom part of fork 10 and the bottom cross section 16 are also illustrated in FIG. 2. FIGS. 2 and 3 show that the housing 18 is suspended from the bottom side of the bottom cross section 16. A U-shaped, metallic frame 42 is provided for this purpose, the sides of which are suspended from the upper end with the help of screws 44 and straps 46. The angular position of the housing 18 can be changed by loosening the screws 44. After the desired angle has been reached, the screws 44 are tightened. As can be identified, there is room for the arrangement of the housing 18 in the area between the fork back 12 and the bottom side of the fork support or the level of the front side of the lifting frame profile 48, which is located approximately in the middle between the fork arms 20 or fork backs 12, as can be seen from FIG. 3. It is also advantageous that the antenna, which is located in housing 18, lies at approximately the same height as the transponder to be contacted when a pallet is picked up with fork 10.

As already mentioned, an evaluation unit is also located in housing 18, which evaluates the signals coming from transponder 32 or 40. The signal of the evaluation unit is connected with an on-board computer of the industrial truck via a cable (not shown). The signal can be read from a display in the driver's cab of the industrial truck. It is also possible to establish a wireless connection. Moreover, a wireless connection can also be established via radio waves with a stationary computing unit, in which warehouse management is performed.

Transponders can be embedded in the floor of the operating area of the vehicle, via which e.g. vehicle navigation is possible, i.e. either via a display in the driver's cab or through intervention in the steering and/or in the speed control.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. System for identifying and managing pallets, which are placed at or picked up from bin locations by means of an industrial truck, with the following characteristics: a box-shaped housing, which contains all components required for communicating with transponders as well as evaluating signals from the transponders, in particular a read/write unit, a send/receive circuit and an evaluation unit, wherein the evaluation unit has an interface to an on-board computer of the industrial truck, the box-shaped housing is attached to the bottom side of the lower cross bar of a support for the loading fork between the fork arms, a single transponder is attached to the front side of the middle block of the pallet, and/or a rack support at the entrance that faces the industrial truck is provided with a transponder on a longitudinal support.

2. System in accordance with claim 1, characterized in that a transponder is provided at a bin location.

3. System in accordance with claim 1, characterized in that, at a bin location, a transponder is arranged in the floor below the bin location.

4. System in accordance with claim 1, characterized in that a U-shaped bracket used to pick up the housing is attached to the bottom side of the lower cross bar.

5. System in accordance with claim 4, characterized in that the bracket is suspended in a pivotable manner from a horizontal axis and can be fixed in a received position.

6. System in accordance with claim 1, characterized in that transponders are embedded in the floor of the track systems of the vehicle for navigating the vehicle via a display in the driver's cab or intervening in the speed control of the vehicle.

7. System for identifying and managing pallets, which are placed at or picked up from bin locations by means of an industrial truck, with the following characteristics:
   a box-shaped housing containing all components required for communicating with transponders as well as evaluating signals from the transponders, in particular a read/write unit, a send/receive circuit and an evaluation unit, wherein the evaluation unit has an interface to an on-board computer of the industrial truck, the box-shaped housing being attached to the bottom side of the lower cross bar of a support for the loading fork between the fork arms;

a single transponder being attached to the front side of the middle block of the pallet;

a transponder on a longitudinal support of a rack support at the entrance that faces the industrial truck; and a transponder is provided at a bin location.

8. System for identifying and managing pallets, which are placed at or picked up from bin locations by means of an industrial truck, with the following characteristics:

a box-shaped housing containing all components required for communicating with transponders as well as evaluating signals from the transponders, in particular a read/write unit, a send/receive circuit and an evaluation unit, wherein the evaluation unit has an interface to an on-board computer of the industrial truck, the box-shaped housing being attached to the bottom side of the lower cross bar of a support for the loading fork between the fork arms;

a single transponder being attached to the front side of the middle block of the pallet;

a transponder on a longitudinal support of a rack support at the entrance that faces the industrial truck; and a U-shaped bracket used to pick up the housing is attached to the bottom side of the lower cross bar.

* * * * *